Jan. 26, 1960     C. J. ARNDT     2,922,208
ROPE SIDE FRAME CONVEYOR CLAMP
Filed March 21, 1958
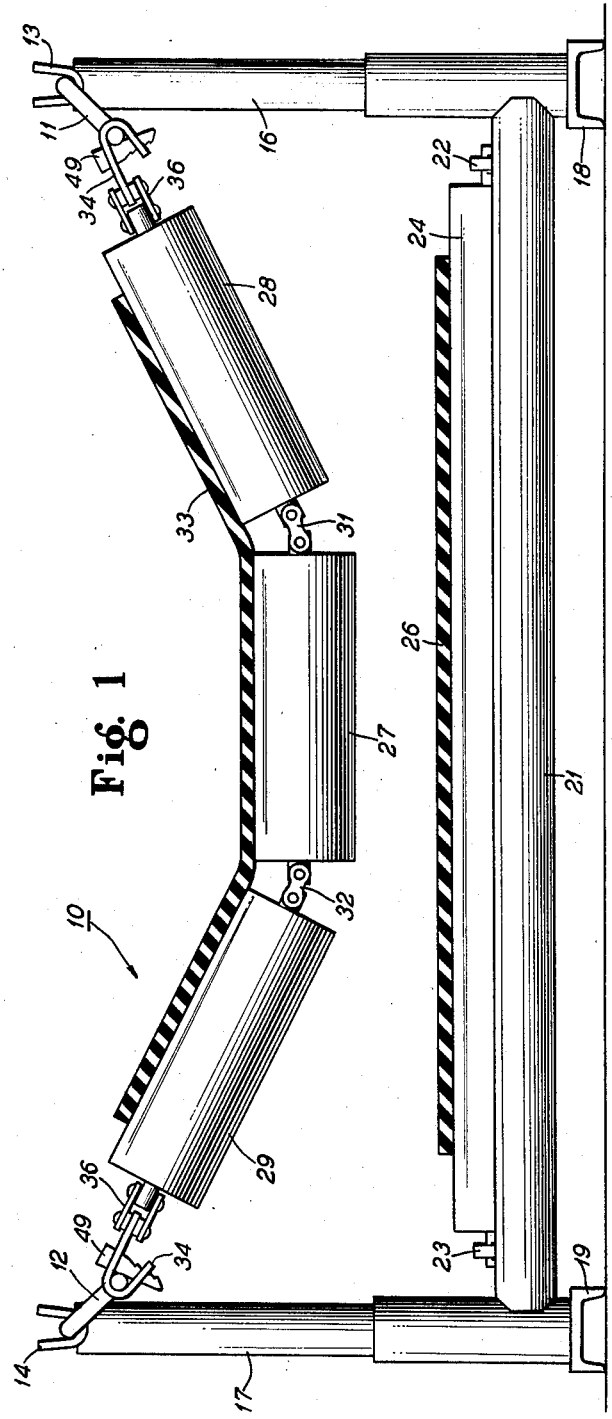
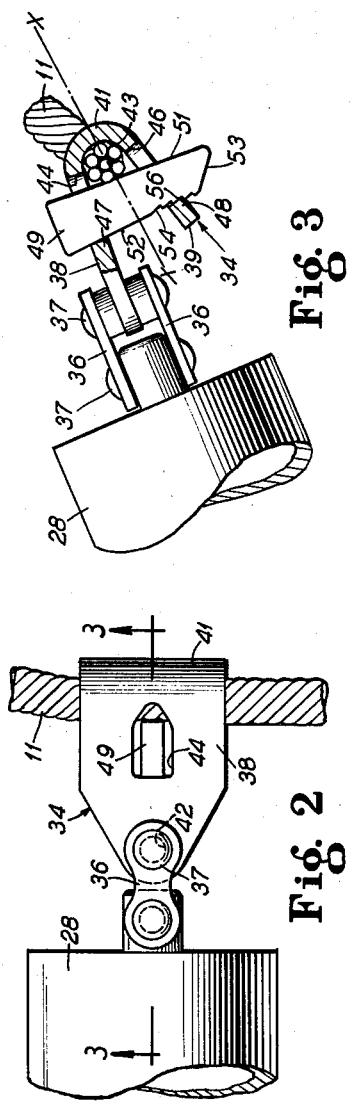
INVENTOR.
Charles J. Arndt
BY *Murray A. Gleeson*
ATTORNEY

United States Patent Office 2,922,208
Patented Jan. 26, 1960

2,922,208

ROPE SIDE FRAME CONVEYOR CLAMP

Charles J. Arndt, Harvey, Ill., assignor to Goodman Manufacturing Company, Chicago, Ill., a corporation of Illinois Application March 21, 1958, Serial No. 722,880

1 Claim. (Cl. 24—126)

This invention relates generally to rope frame conveyors and more particularly to a clamp for supporting a roller assembly on a rope.

In rope frame conveyors, a belt supporting roller assembly is suspended between a pair of ropes which comprise a lengthwise frame of a conveyor. The ropes are supported above the ground and spaced apart from each other by suitable stands and spreaders. Belt supporting roller assemblies are supported on these ropes and must be aligned perpendicularly with respect to the length of the conveyor to assure a true running belt. It is important that, once aligned, the roller assembly remain fixed relative to the rope to prevent detraining the belt as a result of lumps of material impinging on the roller and tending to shift one end of it to a position of misalignment.

One method for supporting the roller assembly on the rope has been to provide a U-shaped hanger having one leg longer than the other to which the roller assembly is attached. A tapered pin is inserted through holes in the legs wedging the rope and clamp into tight engagement to fix the roller assembly relative to the rope. One of the disadvantages of the above clamp has been that the tapered pin tends to vibrate loose allowing the hanger to slip on the rope.

Accordingly, it is a principal object of the present invention to provide a clamp for attaching a roller assembly to a rope in which the tapered pin is interlocked with the hanger to prevent unintended disengagement, the pin respectively having a serrated edge interlocked with a shoulder on the hanger and a relatively smooth edge engageable with the rope.

Other objects and advantages will more fully appear in the following description in which:

Figure 1 is an elevation view in section of a rope frame conveyor;

Figure 2 is a plan view to enlarged scale of a rope clamp used to secure a roller assembly to a rope as shown in Figure 1; and Figure 3 is an elevation view in section taken along the line 3—3 of Figure 2 looking in the direction of the arrows.

Referring now more particularly to the drawings, the numeral 10 designates generally a rope frame conveyor having a pair of ropes 11 and 12 supported in clips 13 and 14. The clips are mounted on legs 16 and 17 resting on feet 18 and 19. A lateral bar 21 spaces the legs apart and provides rigidity for the structure. A pair of brackets 22 and 23 mounted on the lateral bar 21 support a return roller 24 which in turn supports the return reach 26 of the belt. The carrying reach of the belt 33 is supported on a roller assembly which comprises a center roller 27 connected to a pair of wing rollers 28 and 29 by links 31 and 32. The ends of the roller assembly are connected to hangers in the form of rope clamps 34 by connecting means indicated by straps 36 and pins 37. The rope clamps 34 will be described more fully with reference to Figures 2 and 3 which illustrate the hanger and tapered locking pin. The hanger is in the form of a pair of legs 38 and 39 located on either side of a plane X—X passing through the axis of the rope 11. One of the legs 38 is longer than the other and has a hole 42 located near one end to receive the pin 37 by which connection is made between the clamp 34 and roller assembly 10. The two legs 38 and 39 converge toward each other and are connected at their converging ends by a bight 41. The inner surface 43 of the bight 41 forms a rope engaging surface approximately the size of the rope 11. The diverging ends of the legs 38 and 39 provide a ready means for slipping the hanger over the rope 11 even under conditions of poor visibility such as are common in underground mines. The legs are pierced by apertures 44 and 46 extending perpendicularly through the legs to form square shoulders such as 47 and 48. A projection of the shoulders 47 and 48 on plane X—X would form mirror images of each other, that is, corresponding parts of the shoulders are in substantial alignment with each other although the shoulders are formed by perpendicular apertures in non parallel legs.

An elongated tapered locking pin 49 generally rectangular in cross section, note Fig. 2, extends through the apertures 44—46 and is positioned therein with the end portions thereof in longitudinally outwardly projecting relationship to the adjacent legs 38—39 of the hanger. The locking pin 49 is provided with a plurality of generally longitudinally extending surfaces. It is to be noted that one of the surfaces 51 is substantially smooth and unobstructed throughout the full longitudinal extent there of and is disposed in facing relationship to the surface 43 of the bight 41 for engaging the rope 11 to force it tightly into engagement with the rope engaging surface 43 of the bight 41. Another surface of the pin 49 which is opposed to the surface 51 is divided into a pair of generally longiudinally spaced smooth portions 52 and 53 which are separated by a notched or serrated portion 54. The notches of the serrated portion 54 engage one shoulder 48 and the smooth portion 52 engages the other shoulder 47. The notches of portion 54 have a 90-degree root angle to match the perpendicular shoulder 48 so that the sides of the notch fit the sides of the shoulder. The notches are angularly disposed in the pin 49 so that one side 56 of a notch is parallel to the leg with which it is engaged. Thus the notches can be of any convenient depth or pitch without regard to the thickness of the leg because of the divergence of the legs in which the mating shoulders are formed.

The lower smooth portion 53 of the tapered pin is oblique to or disposed at angle with respect to the surface 51, the upper smooth portion 52 and the notched portion 54. The degree of angularity of the smooth portion 53 is such that a blow struck normal to the surface 53 is effective to disengage the side 56 of a notch from the shoulder 48 and also to urge the pin 49 out of the apertures 44 and 46.

The rope clamp 34 is "staked" in position by a blow on a laterally extending surface of the locking pin 49 which is effective to wedge the rope into tight engagement with the hanger, and to interlock the pin with the hanger to prevent unintended disengagement. A blow on the lower portion 53 of the pin is effective to disengage the interlocked surfaces and drive the pin out of engagement with the hanger and rope.

While the present invention has been shown and described in terms of a preferred embodiment, it will be understood that various modifications may be made without departing from the spirit and scope of the appended claim.

I claim:

Clamping apparatus for connecting an elongated conveyor component between a pair of spaced flexible strand sideframes of a conveyor assembly: said clamping apparatus including a strand clamp disposed adjacent each end portion of the conveyor component; each of said strand clamps including a hanger comprising a bight portion having a surface for engaging the respective strand and a pair of spaced leg portions extending from the bight portion in divergent relationship to each other, one of said leg portions extending beyond the other leg portion and having connecting means thereon for connecting the clamp to the respective end portion of the conveyor component, each of said leg portions having an aperture extending generally perpendicularly therethrough to define generally aligned substantially square shoulders each having a straight side portion; and an elongated tapered locking pin for engaging the respective strand when the strand is positioned within the bight portion of the respective hanger, each of said locking pins extending through the respective apertures with each end portion of each locking pin projecting generally outwardly from the shoulder of the respective leg portions, each of said locking pins being substantially rectangular in cross-section and having a pair of opposed generally longitudinally extending tapered surfaces disposed intermediate the end portions thereof, one of said surfaces being substantially smooth and unobstructed throughout the longitudinal extent thereof and disposed in facing relationship to the surface of the bight portion and in engagement with the respective strand, the other of said surfaces having longitudinally spaced substantially smooth first and second portions disposed in opposed relationship to the said one surface of the locking pin with the said first portion of said other surface engaging the straight side portion of the shoulder of the said one leg portion of the respective hanger for positioning the locking pin within the respective apertures, and a serrated portion disposed in a plane common with said first portion of the said other surface and having a plurality of notches disposed intermediate the said spaced first and second portions of said other surface, each of said notches having a 90-degree root angle corresponding to the straight sides of the square shoulders of the respective leg portions, one of said notches being disposed in interlocking engagement with the straight side portion of the shoulder of the other leg portion of the respective hanger for removably retaining the locking pin within the respective apertures, the said second portion of the said other surface of each locking pin having a surface disposed immediately adjacent to the serrated portion and oblique to the said plane against which a force may be applied to effectively disengage each of said one notches of the serrated portion from the shoulder of the respective other leg portion to enable each locking pin to be readily removed from the respective apertures.

References Cited in the file of this patent

UNITED STATES PATENTS

| | | |
|---|---|---|
| 765,256 | Shaw | July 19, 1904 |
| 1,727,038 | Rousey | Sept. 3, 1929 |
| 2,333,925 | Gressett | Nov. 9, 1943 |
| 2,777,659 | Meysan et al. | Jan. 15, 1957 |
| 2,828,147 | Peiffer | Mar. 25, 1958 |